United States Patent
Sillard et al.

(10) Patent No.: US 6,263,138 B1
(45) Date of Patent: Jul. 17, 2001

(54) OPTICAL FIBER FOR COMPENSATING CHROMATIC DISPERSION OF A POSITIVE CHROMATIC DISPERSION OPTICAL FIBER

(75) Inventors: Pierre Sillard; Louis-Anne de Montmorillon, both of Paris; Ludovic Fleury, Bois d'Arcy; Pascale Nouchi, Maisons Laffitte, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/372,087

(22) Filed: Aug. 11, 1999

(30) Foreign Application Priority Data

Jun. 29, 1999 (FR) .................................. 99 08 298

(51) Int. Cl.$^7$ ...................................... G02B 6/26
(52) U.S. Cl. ............................. 385/123; 385/27
(58) Field of Search .................... 385/123, 124, 385/27

(56) References Cited

U.S. PATENT DOCUMENTS

| | | | |
|---|---|---|---|
| 5,033,846 | * | 7/1991 | Hernday et al. .................. 356/73.1 |
| 5,224,183 | * | 6/1993 | Dugan .................................. 385/24 |
| 5,781,673 | * | 7/1998 | Reed et al. .......................... 385/24 |
| 5,854,871 | * | 12/1998 | Akasaka ............................. 385/123 |
| 5,887,093 | * | 3/1999 | Hansen et al. ....................... 385/27 |

* cited by examiner

Primary Examiner—Frnak G. Font
Assistant Examiner—Michael P. Monney
(74) Attorney, Agent, or Firm—Sughrue, Mion, Zinn Macpeak & Seas, PLLC

(57) ABSTRACT

An optical fiber for compensating chromatic dispersion of a positive chromatic dispersion optical fiber has at a wavelength of 1 550 nm a chromatic dispersion less than −40 ps/(nm.km), a ratio between the chromatic dispersion and the chromatic dispersion slope in the range from 50 nm to 230 nm, an effective area greater than or equal to 12 $\mu m^2$ and curvature losses less than or equal to 0.05 dB. It is used for in-line compensation of cumulative chromatic dispersion in a positive chromatic dispersion line fiber. A fiber optic transmission system is also disclosed using a fiber of this kind to compensate the cumulative chromatic dispersion in the line fiber.

27 Claims, 2 Drawing Sheets

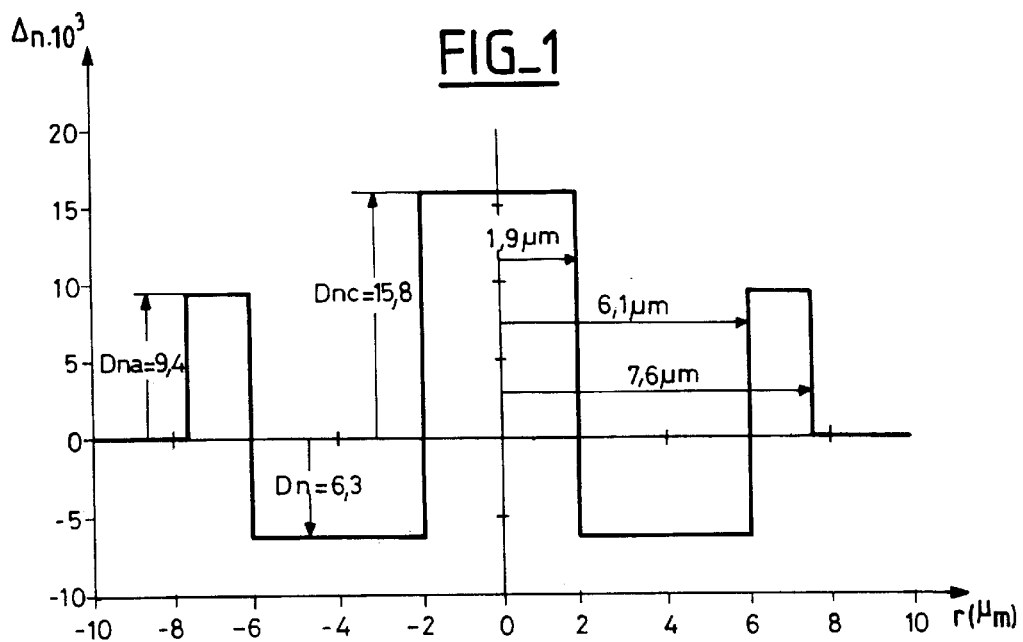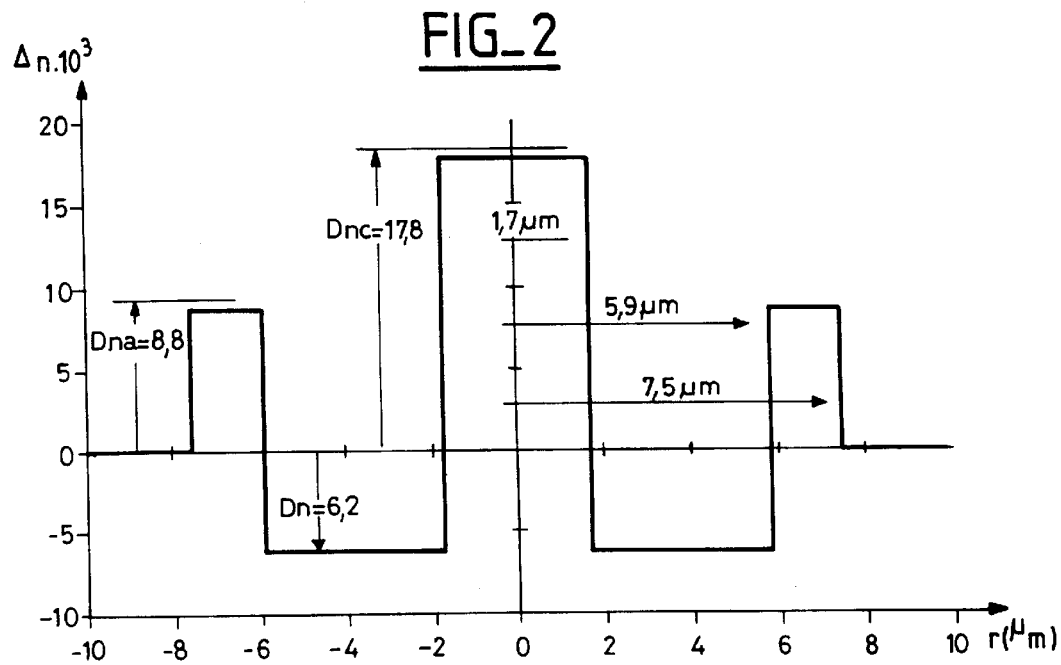

FIG_3
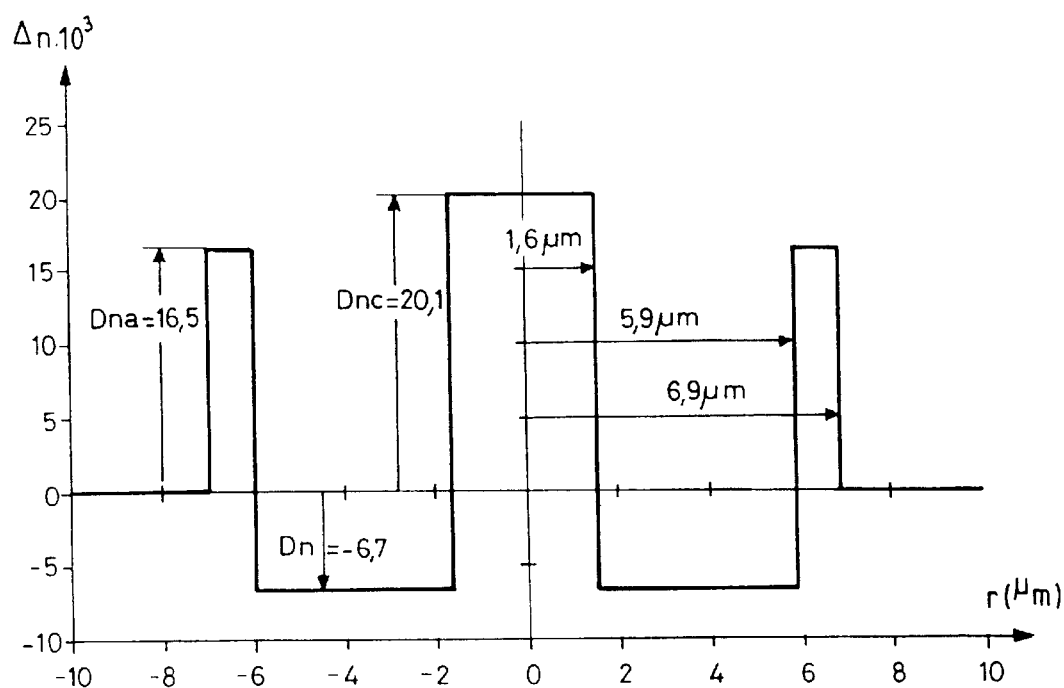
FIG_4
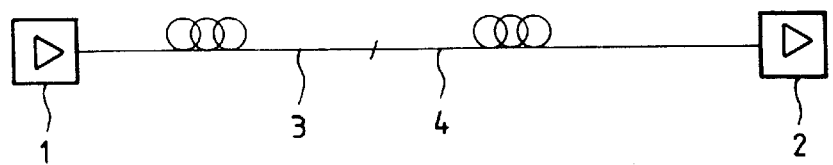

OPTICAL FIBER FOR COMPENSATING CHROMATIC DISPERSION OF A POSITIVE CHROMATIC DISPERSION OPTICAL FIBER

BACKGROUND OF THE INVENTION

1. Field of the Invention

The present invention concerns the field of transmission on optical fiber.

2. Description of the Prior Art

The index profile of an optical fiber is generally described by the shape of the graph of the refractive index as a function of the radius of the fiber. The distance r from the center of the fiber is conventionally plotted on the abscissa axis and the difference between the refractive index of the fiber and the refractive index of the cladding is conventionally plotted on the ordinate axis. The expressions "step", "trapezium" and "triangle" index profiles are therefore used for graphs which are respectively step-, trapezium- and triangle-shaped. These curves are generally representative of the theoretical or set point profile of the fiber, and fiber manufacturing constraints can lead to a substantially different profile.

In new high bit rate wavelength division multiplex transmission networks it is advantageous to control chromatic dispersion, especially for per channel bit rates of 10 Gbit/s and above. The objective is to restrict widening of the pulses by obtaining substantially no cumulative chromatic dispersion for all wavelength values of the multiplex. A cumulative dispersion value of a few hundred ps/nm is generally acceptable. It is also beneficial to avoid zero values of chromatic dispersion in the vicinity of the wavelengths used in the system, because non-linear effects are greater at these values. Finally, it is also beneficial to limit the chromatic dispersion slope over the range of the multiplex to restrict or restrict distortion between the channels of the multiplex.

Stepped index fibers are conventionally used as line fibers in fiber optic transmission systems. The assignees of the inventors sell an ASMF 200 stepped index monomode fiber having a chromatic dispersion cancellation wavelength $\lambda_0$ in the range from 1 300 nm to 1 320 nm and a chromatic dispersion less than or equal to 3.5 ps/nm/km in a range from 1 285 nm to 1 330 nm and of 17 ps/nm.km at 1 550 nm. The chromatic dispersion slope at 1 550 nm is in the order of 0.06 ps/nm$^2$.km.

Dispersion shifted fibers (DSF) have also appeared on the market. These fibers have substantially no chromatic dispersion at the transmission wavelength at which they are used, which is generally different from the wavelength of 1.3 $\mu$m for which silica shows substantially no dispersion. In other words, the non-zero chromatic dispersion of the silica is compensated—whence the use of the word "shifted"—by increasing the index difference $\Delta n$ between the core of the fiber and the optical cladding. The index shift means that the wavelength for which there is substantially no chromatic dispersion can be shifted. It is achieved by introducing dopants into the preform, during its manufacture, for example by a conventional MCVD process which is not described in more detail here.

Non-zero dispersion shifted fibers (NZ-DSF+) have a non-zero and positive chromatic dispersion at the wavelength at which they are used. At these wavelengths these fibers have a low chromatic dispersion, typically less than 10 ps/(nm.km) at 1 550 nm, and a chromatic dispersion slope in the range from 0.04 ps/(nm$^2$.km) to 0.1 ps/(nm$^2$.km).

Using short lengths of dispersion compensating fiber (DCF) to compensate the chromatic dispersion and the chromatic dispersion slope in SMF or NZ-DSF+ fibers used as line fibers is conventional. One example of a transmission system of this kind in which the chromatic dispersion in an SMF type line fiber is compensated by DCF type fiber is described in "Dispersion compensating fibers and their applications" by M. Nishimura et al., OFC'96 Technical digest ThA1.

Such use of dispersion compensating fiber is also mentioned in "Large volume manufacturing of dispersion compensating fibers" by L. Grüner-Nielsen et al., OFC'98 Technical Digest TuD5. A disadvantage of this type of fiber is its high cost.

DCF type fibers are described in various patents. They have around the wavelength of 1 550 nm a negative chromatic dispersion to compensate the cumulative chromatic dispersion in the line fiber and can have a negative chromatic dispersion slope to compensate the positive slope of the chromatic dispersion of the line fiber. Thus U.S. Pat. No. 5,581,647 proposes (see table VI, examples B1 and B2), fibers having respective chromatic dispersions of −85 ps/(nm.km) and −100 ps/(nm.km) and chromatic dispersion slopes of −0.2 ps/(nm$^2$.km) and −0.26 ps/(nm$^2$.km). The ratio of the chromatic dispersion to the chromatic dispersion slope is then in the range from 425 nm to 500 nm. Such values are suitable for compensating chromatic dispersion and chromatic dispersion slope of SMF type line fibers.

U.S. Pat. No. 5,361,319 also proposes DCF type fibers. One index profile it proposes is a rectangular index profile with a trench and a ring; the fibers proposed are adapted to compensate chromatic dispersion and chromatic dispersion slope in SMF type fibers having a chromatic dispersion in the order of 15 ps/(nm.km) and a chromatic dispersion slope in the order of 0.06 ps/(nm$^2$.km). One of the target values proposed for DCF type fiber is therefore −60 ps/(nm.km) for the chromatic dispersion and −0.24 ps/(nm$^2$.km) for the chromatic dispersion slope.

U.S. Pat. No. 5,555,340 also proposes a DCF type fiber with an alpha profile and buried cladding. One of the points on the chromatic dispersion and chromatic dispersion slope graphs from FIGS. 5A and 5B of the above document corresponds to a fiber in which the ratio between the radii of the buried cladding and the alpha part is 0.4, with a diameter of 3.3 $\mu$m for the alpha part. For this fiber the chromatic dispersion is in the order of −90 ps/(nm.km) and the chromatic dispersion slope is in the order of −0.6 ps/(nm$^2$.km). The document does not specify the effective area of the fiber. Calculation of the properties of the fiber shows that the effective area is in the order of 10 $\mu$m$^2$.

U.S. Pat. No. 5,568,583 proposes a DCF type fiber with a rectangular profile and buried cladding; it specifies that the DCF type fiber is assumed to be used to compensate SMF type fiber having a dispersion in the order of 17 ps/(nm.km). The dispersion and dispersion slope values for various core diameters set out in tables 1, 2 and 3 of the above document do not agree with the proposed profile and cannot be clearly obtained for that profile.

EP-A-0 866 574 proposes a DCF type fiber having a rectangular profile with a ring. This fiber supports propagation not only in LP01 mode but also in the higher LP02 mode. Chromatic dispersion is very high, typically less than −200 ps/(nm.km) for LP02 mode.

U.S. Pat. No. 5,838,867 proposes DCF fibers having alpha profiles with buried claddings and with or without rings. The proposed fibers are suitable for compensating chromatic dispersion and chromatic dispersion slope of shifted dispersion fibers having zero chromatic dispersion in the range from 1 450 nm to 1 550 nm or from 1 450 nm to 1 650 nm and a positive dispersion slope. The target values proposed for the DCF type fibers are greater than −40 ps/(nm.km) for the chromatic dispersion, for example (FIG. 10) a chromatic dispersion of −35 ps/(nm.km) with a chromatic dispersion slope of −0.15 ps/(nm².km) and (FIG. 11) a chromatic dispersion of −30 ps/(nm.km) with a chromatic dispersion slope of −0.39 ps/(nm².km).

Finally, PCT/JP98/04066 proposes DCF type fibers having rectangular profiles and buried claddings. The proposed fibers are suitable for compensating chromatic dispersion and chromatic dispersion slope of the TRUE WAVE fibers sold by A.T.&T. Corporation, which have chromatic dispersions of 1.5 ps/(nm.km) to 4 ps/(nm.km). Curvature losses are not specified in the document. Calculating the properties of the fibers described in examples 1 and 2 for the ranges of index differences and of core part diameters given shows that the curvature losses are greater than 0.05 dB.

French patent application 99 02028 filed Feb. 18, 1999 with the title "Fibre de ligne pour systèmes de transmission à fibre optique à multiplexage en longueurs d'onde" ("Line fiber for transmission systems using wavelength division multiplexed optical fiber") proposes a line fiber more particularly suited to dense wavelength division multiplex transmission, with a channel spacing of 100 GHz or less for a per-channel bit rate of 10 Gbit/s. For a wavelength of 1550 nm, this fiber has an effective area greater than or equal to 60 $\mu m^2$, a chromatic dispersion in the range from 6 ps/(nm.km) to 10 ps/(nm.km) and a chromatic dispersion slope less than 0.07 ps/(nm².km).

The invention proposes a fiber suitable for compensating chromatic dispersion in the above type of fiber. It provides a fiber having strongly negative chromatic dispersion and chromatic dispersion slope so that compensation can be obtained with the shortest possible length of fiber. The fiber has low curvature losses and can easily be used as the line fiber in a transmission system.

SUMMARY OF THE INVENTION

To be more precise, the invention proposes an optical fiber having at a wavelength of 1 550 nm a chromatic dispersion less than −40 ps/(nm.km), a ratio between the chromatic dispersion and the chromatic dispersion slope in the range from 50 nm to 230 nm, an effective area greater than or equal to 12 $\mu m^2$ and curvature losses less than or equal to 0.05 dB.

The fiber preferably has at a wavelength of 1 550 nm a chromatic dispersion less than or equal to −50 ps/(nm.km).

The fiber can have for a wavelength of 1 550 nm a ratio between the chromatic dispersion and the chromatic dispersion slope less than 200 nm, 180 nm or 160 nm.

The fiber can have for a wavelength of 1 550 nm a ratio between the chromatic dispersion and the chromatic dispersion slope greater than 80 nm, 100 nm or 120 nm.

All combinations of the above upper and lower limits can be used to define a preferred range for this ratio.

In one embodiment the fiber has at a wavelength of 1 550 nm an effective area greater than or equal to 15 $\mu m^2$, preferably greater than or equal to 20 $\mu m^2$.

In another embodiment the fiber has at a wavelength of 1 550 nm an attenuation less than or equal to 1 dB/km.

In a further embodiment the fiber has at a wavelength of 1 550 nm a mode diameter greater than or equal to 4 $\mu m$.

The fiber advantageously has at a wavelength of 1 550 nm a sensitivity to microcurvatures less than or equal to 1 and preferably less than or equal to 0.5.

The fiber can have a rectangular index profile with a depleted trench and a ring. In this case, the difference between the index of the buried part and the index of the cladding is preferably greater than or equal to $-8\times10^{-3}$.

The invention also proposes use of a fiber of the above kind as a dispersion compensation fiber in a wavelength division multiplex fiber optic transmission system.

The compensation fiber can then be incorporated in a cable and used as a line fiber or placed in a compensation module.

The invention then proposes a wavelength division multiplex fiber optic transmission system comprising a first line fiber section and a second line fiber section of the kind defined above.

The line fiber of the first section advantageously has at a wavelength of 1 550 nm a chromatic dispersion in the range from 5 ps/(nm.km) to 11 ps/(nm.km) and a chromatic dispersion slope less than or equal to 0.08 ps/(nm².km).

In one embodiment the ratio of the length of the first section to the length of the second section is substantially equal to the reciprocal of the absolute value of the ratio of the chromatic dispersion at 1 550 nm of the fibers of the first section and the second section.

The cumulative chromatic dispersion for each channel in the range from 1 530 nm to 1 620 nm is advantageously less than 100 ps/nm and preferably less than 50 ps/nm on average over a transmission distance of 100 km.

The invention finally proposes a wavelength division multiplex fiber optic transmission system comprising line fiber and fiber of the kind defined above as compensation fiber in a compensation module.

The line fiber of the first section advantageously has at a wavelength of 1 550 nm a chromatic dispersion in the range from 5 ps/(nm.km) to 11 ps/(nm.km) and a chromatic dispersion slope less than or equal to 0.08 ps/(nm².km).

The ratio of the length of the line fiber to the length of the compensation fiber is preferably substantially equal to the reciprocal of the absolute value of the ratio of the chromatic dispersions at 1 550 nm of the line and compensation fibers.

The cumulative chromatic dispersion for each channel in the range from 1 530 nm to 1 620 nm is advantageously less than 100 ps/nm and preferably less than 50 ps/nm on average over a transmission distance of 100 km.

Other features and advantages of the invention will become apparent on reading the following description of embodiments of the invention, which is given by way of example and with reference to the accompanying drawings.

BRIEF DESCRIPTION OF THE DRAWINGS

FIGS. 1 to 3 are diagrammatic representations of the fiber set point index profile in various embodiments of the invention.

FIG. 4 is a diagrammatic representation of a section of a transmission system using dispersion compensation fiber of the invention.

DETAILED DESCRIPTION OF THE PREFERRED EMBODIMENTS

The invention proposes a dispersion compensation fiber having at a wavelength of 1 550 nm a chromatic dispersion less than −40 ps/(nm.km), a negative chromatic dispersion slope, a ratio of the chromatic dispersion to the chromatic dispersion slope in the range from 50 nm to 230 nm, an effective area greater than 12 $\mu m^2$ and curvature losses less than or equal to 0.05 dB.

The preferred specifications of the fiber of the invention are therefore as follows:

- chromatic dispersion at 1 550 nm less than or equal to −40 ps/(nm.km) and preferably less than or equal to −50 ps/(nm.km);
- ratio between chromatic dispersion and chromatic dispersion slope at 1 550 nm in the range from 50 nm to 230 nm, preferably in the range from 80 nm to 200 nm, more preferably in the range from 100 nm to 180 nm and even more preferably in the range from 120 nm to 160 nm;
- effective area greater than 12 $\mu m^2$ or even 15 $\mu m^2$ or preferably 20 $\mu m^2$;
- sensitivity to microcurvatures at 1550 nm less than or equal to 1 or preferably less than or equal to 0 5;
- curvature losses at 1 550 nm less than or equal to 0.05 dB and preferably less than $5.10^{-3}$ dB.

The fiber of the invention can be used for in-line compensation of the fiber proposed in the aforementioned French application or fibers of the same type. It is particularly suitable for fibers having a chromatic dispersion in the range from 5 ps/(nm.km) to 11 ps/(nm.km) and a chromatic dispersion slope less than 0.08 ps/(nm².km), in particular because of the value of the ratio between its chromatic dispersion and chromatic dispersion slope, which is in the range from 50 nm to 230 nm.

It can be used as a component in a compensator module, i.e. in a discrete module rather than as the line fiber. It then preferably has an effective cut-off wavelength (as defined in ITU-T standard G.650) less than or equal to 1 550 nm.

It can also be incorporated into a cable and used as compensation line fiber, preferably with an in-cable cut-off wavelength less than or equal to 1 300 nm.

The fiber of the invention can be used to construct very high bit rate transmission systems using wavelength division multiplexing and providing bit rates up to N×20 Gbit/s or N×40 Gbit/s, for example.

Curvature losses are evaluated in the conventional way by measuring the losses induced in a fiber on winding 100 turns of the fiber around a 30 mm radius drum. Sensitivity to microcurvatures is evaluated relative to the ASMF 200 fiber sold by the assignees of the inventors. The conventional method of crushing the fiber between two grids can be used.

Examples of fiber profiles which can produce such values are given in the remainder of the description with reference to the figures. The profiles from FIGS. 1 to 3 are the same shape and vary in terms of the numerical values of the radii and the indices.

FIG. 1 is a diagrammatic representation of the set point index profile of a first embodiment of a fiber in accordance with the invention. In this embodiment, the index profile is a rectangular index profile with a buried trench and a ring and has, starting from the center of the fiber:

- a central part with a substantially constant index greater than or equal to the index of the cladding, and
- an annular part having an index lower than or equal to the index of the cladding, the index difference relative to the cladding preferably being greater than $-8.10^{-3}$ (a minimum value of the index difference facilitates manufacture of the fiber), the combination constituting a "rectangular with buried or depleted trench" index profile.

The fiber from FIG. 1 has a ring around the buried trench, i.e. a part with an index higher than the index of the cladding, whence the designation rectangular profile with buried trench and ring.

The index and radius values in the FIG. 1 embodiment are as follows.

The central rectangle has a radius $r_1$ of 1.9 $\mu$m and the difference $\Delta n_1$ between its index and the index of the cladding is $15.8 \times 10^{-3}$.

The buried trench lies between the radii $r_1$ and $r_2$, with $r_2$=6.1 $\mu$m, and the difference $\Delta n_2$ between its index and the index of the cladding is $-6.3 \times 10^{-3}$.

The ring extends around the trench, between the radii $r_2$ and $r_3$, where $r_3$=7.6 $\mu$m. It has an index difference $\Delta n_3$ relative to the cladding of $9.4 \times 10^{-3}$.

The cladding of the fiber, relative to which the index differences are measured, extends around the ring.

The above values produce a fiber having the following specifications:

- cut-off wavelength $\lambda_c$: 1 773 nm,
- effective area at 1 550 nm: 22 $\mu m^2$,
- chromatic dispersion at 1 550 nm: −51 ps/(nm.km),
- chromatic dispersion slope at 1 550 nm: −0.35 ps/(nm².km),
- ratio between chromatic dispersion and chromatic dispersion slope: 145 nm,
- mode diameter $2W_{02}$ at 1 550 nm: 5.2 $\mu$m,
- attenuation due to curvature at 1 550 nm, for 100 turns on a 30 mm radius spool: $\leq 10^{-5}$ dB,
- sensitivity to microcurvatures at 1 550 nm: 0.5.

The cut-off wavelength given here is the theoretical cut-off wavelength. In practise, the effective cut-off wavelength as specified in ITU-T standard G.650 and the wavelength measured on the cable are a few hundred nm less. The fiber is effectively monomode fiber in the range of wavelengths of the payload signals, for example from 1 530 nm to 1 620 nm.

FIG. 2 is a diagrammatic representation of the index profile of another fiber in accordance with the invention. The figure clearly shows that the profile is a similar shape to that from FIG. 1, with different numerical values. These values are as follows:

The rectangle has a radius $r_1$ of 1.7 $\mu$m and its index difference $\Delta n_1$ relative to the cladding is $17.8 \times 10^{-3}$.

The buried trench extends around the rectangle to a radius $r_2$ of 5.9 $\mu$m and its index difference relative to the cladding is $-6.2 \times 10^{-3}$.

The ring extends around the trench to a radius $r_3$=7.5 $\mu$m. Its index difference $\Delta n_3$ relative to the cladding is $8.8 \times 10^{-3}$.

The cladding of the fiber, relative to which the index differences are measured, extends around the ring.

The above values produce a fiber having the following specifications:

- cut-off wavelength $\lambda_c$: 1 788 nm,
- effective area at 1 550 nm: 20.5 $\mu m^2$,
- chromatic dispersion at 1 550 nm: −75 ps/(nm.km),
- chromatic dispersion slope at 1 550 nm: −0.51 ps/(nm².km),
- ratio between chromatic dispersion and chromatic dispersion slope: 147 nm,
- mode diameter $2W_{02}$ at 1 550 nm: 5 $\mu$m,
- attenuation due to curvature at 1 550 nm, for 100 turns on a 30 mm radius spool: $\leq 10^{-5}$ dB,
- sensitivity to microcurvatures at 1 550 nm: 0.45.

The FIG. 3 embodiment corresponds to a fiber with even greater chromatic dispersion than the previous fibers. The index and radius values are as follows:

$r_1=1.6$ μm, $\Delta n_1=20.1\times10^{-3}$, $r_2=5.9$ μm, $\Delta n_2=-6.7\times10^{-3}$, $r_3=6.9$ μm, $\Delta n_3=16.5\times10^{-3}$.

The following specifications are obtained for the fiber from FIG. 3:

cut-off wavelength $\lambda_c$: 1 857 nm, effective area at 1 550 nm: 20 μm$^2$, chromatic dispersion at 1 550 nm: −113 ps/(nm.km), chromatic dispersion slope at 1 550 nm: −0.76 ps/(nm$^2$.km), ratio between chromatic dispersion and chromatic dispersion slope: 148 nm, mode diameter $2W_{02}$ at 1 550 nm: 4.9 μm, attenuation due to curvature at 1 550 nm, for 100 turns on a 30 mm radius spool: $\leq 10^{-5}$ dB, sensitivity to microcurvatures at 1 550 nm: 0.5.

In all the above embodiments, index variations $\Delta n_1$ of 5% of the central part or index differences $\Delta n_2$ and $\Delta n_3$ of 10% of the buried trench and the ring produce similar results. The same applies to the radii, which can individually vary by 5% relative to the values given in the examples from the figures and still produce similar results.

FIG. 4 is a diagrammatic representation of part of a transmission system using the compensation fiber of the invention as line fiber. FIG. 4 shows two closely spaced amplifiers 1 and 2 of the transmission system. Between the two amplifiers, the line fiber is made up of a section 3 of fiber of the type disclosed in the aforementioned French patent application and a second section 4 of fiber in accordance with the invention. The fiber of the first section has a chromatic dispersion at 1 550 nm of 8 ps/(nm.km) and a chromatic dispersion slope at the same wavelength of 0.055 ps/(nm$^2$.km). Using a dispersion compensation fiber as shown in FIG. 1 in the second section compensates the cumulative chromatic dispersion in the first section of fiber over the range of wavelengths of the multiplex. The dispersion compensation fiber has a ratio between the chromatic dispersion and the chromatic dispersion slope of 145 nm. The ratio of the chromatic dispersion to the chromatic dispersion slope in the line fiber of the first section is 145 nm.

The ratio of the respective lengths of the fibers of the first and second sections is chosen to minimize the cumulative chromatic dispersions on the link and in this example can be in the order of 6.4, which is close to the reciprocal of the chromatic dispersion ratio 8/51.

In a case like this, for a first fiber section 86 km long and a second compensation fiber section 14 km long, the cumulative chromatic dispersion for the 1 550 nm channel of the multiplex is close to 0 ps/nm.

In the range of the multiplex, i.e. in the range from 1 530 nm to 1 620 nm, the cumulative chromatic dispersion is less than 50 ps/nm for each channel for the 100 km of the first and second sections. The cumulative chromatic dispersion is therefore limited to values below 100 ps/nm for each channel, on average, over 100 km, as indicated above.

The skilled person can fabricate the fiber in accordance with the invention using conventional techniques such as the MCVD technique or other techniques routinely used to fabricate optical fibers.

Of course, the present invention is not limited to the examples and embodiments described and shown and is open to many variants that will be evident to the skilled person. The profiles in FIGS. 1 to 3 are clearly given by way of example only and other profiles can produce fibers having the features of the invention. The fiber of the invention can be used as in the FIG. 4 embodiment in a repeatered transmission system or in a repeaterless transmission system.

What is claimed is:

1. An optical fiber having at a wavelength of 1 550 nm a chromatic dispersion less than −40 ps/(nm.km) a ratio between the chromatic dispersions and the chromatic dispersion slope in the range from 50 nm to 230 nm, an effective area greater than or equal to 12 μm$^2$ and curvature losses less than or equal to 0.05 dB.

2. The fiber claimed in claim 1 having at a wavelength of 1 550 nm a chromatic dispersion less than or equal to −50 ps/(nm.km).

3. The fiber claimed in claim 1 having at a wavelength of 1 550 nm a ratio between the chromatic dispersion and the chromatic dispersion slope less than 200 nm.

4. The fiber claimed in claim 1 having at a wavelength of 1 550 nm a ratio between the chromatic dispersion and the chromatic dispersion slope less than 180 nm.

5. The fiber claimed in claim 1 having at a wavelength of 1 550 nm a ratio between the chromatic dispersion and the chromatic dispersion slope less than 160 nm.

6. The fiber claimed in claim 1 having at a wavelength of 1 550 nm a ratio between the chromatic dispersion and the chromatic dispersion slope greater than 80 nm.

7. The fiber claimed in claim 1 having at a wavelength of 1 550 nm a ratio between the chromatic dispersion and the chromatic dispersion slope greater than 100 nm.

8. The fiber claimed in claim 1 having at a wavelength of 1 550 nm a ratio between the chromatic dispersion and the chromatic dispersion slope greater than 120 nm.

9. The fiber claimed in claim 1 having at a wavelength of 1 550 nm an effective area greater than or equal to 15 μm$^2$, preferably greater than or equal to 20 μm$^2$.

10. The fiber claimed in claim 1 having at a wavelength of 1 550 nm an attenuation less than or equal to 1 dB/km.

11. The fiber claimed in claim 1 having at a wavelength of 1 550 nm a mode diameter greater than or equal to 4 μm.

12. The fiber claimed in claim 1 having at a wavelength of 1 550 nm a sensitivity to microcurvatures less than or equal to 1 and preferably less than or equal to 0.5.

13. The fiber claimed in claim 1 having a rectangular index profile with a depleted trench and a ring.

14. The fiber claimed in claim 13 wherein the difference between the index of the buried part and the index of the cladding is greater than or equal to −8×10$^{-3}$.

15. A dispersion compensation fiber in a wavelength division multiplex fiber optic transmission system, said dispersion compensation fiber comprising a fiber as claimed in claim 1.

16. The dispersion compensation fiber claimed in claim 15 wherein the compensation fiber is incorporated in a cable and used as a line fiber.

17. The dispersion compensation fiber claimed in claim 15 wherein the compensation fiber is placed in a compensation module.

18. A wavelength division multiplex fiber optic transmission system comprising a first line fiber section, and a second line fiber section as claimed in claim 1.

19. The transmission system claimed in claim 18 wherein said line fiber of said first section has at a wavelength of 1 550 nm a chromatic dispersion in the range from 5 ps/(nm.km) to 11 ps/(nm.km).

20. The transmission system claimed in claim 18 wherein said line fiber of said first section has at a wavelength of 1

550 nm a chromatic dispersion slope less than or equal to 0.08 ps/(nm².km).

21. The system claimed in claim 18 wherein the ratio of the length of said first section to the length of said second section is substantially equal to the reciprocal of the absolute value of the ratio of the chromatic dispersion at 1 550 nm of the fibers of said first section and said second section.

22. The system claimed in claim 18 wherein the cumulative chromatic dispersion for each channel in the range from 1 530 nm to 1 620 nm is less than 100 ps/nm and preferably less than 50 ps/nm on average over a transmission distance of 100 km.

23. A wavelength division multiplex fiber optic transmission system comprising line fiber and fiber as claimed in claim 1 as compensation fiber in a compensation module.

24. The transmission system claimed in claim 23 wherein said line fiber has at a wavelength of 1 550 nm a chromatic dispersion in the range from 5 ps/(nm.km) to 11 ps/(nm.km).

25. The transmission system claimed in claim 23 wherein said line fiber has at a wavelength of 1 550 nm a chromatic dispersion slope less than or equal to 0.08 ps/(nm².km).

26. The system claimed in claim 23 wherein the ratio of the length of said line fiber to the length of said compensation fiber is substantially equal to the reciprocal of the absolute value of the ratio of the chromatic dispersions at 1 550 nm of said line and compensation fibers.

27. The system claimed in claim 23 wherein the cumulative chromatic dispersion for each channel in the range from 1 530 nm to 1 620 nm is less than 100 ps/nm and preferably less than 50 ps/nm on average over a transmission distance of 100 km.

\* \* \* \* \*